US012061995B2

United States Patent
Bui et al.

(10) Patent No.: US 12,061,995 B2
(45) Date of Patent: Aug. 13, 2024

(54) LEARNING WITH LIMITED SUPERVISION FOR QUESTION-ANSWERING WITH LIGHT-WEIGHT MARKOV MODELS

(71) Applicant: ADOBE INC., San Jose, CA (US)

(72) Inventors: Trung Huu Bui, San Jose, CA (US); Tong Sun, San Ramon, CA (US); Natwar Modani, Karnataka (IN); Lidan Wang, San Jose, CA (US); Franck Dernoncourt, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 1193 days.

(21) Appl. No.: 16/813,098

(22) Filed: Mar. 9, 2020

(65) Prior Publication Data

US 2021/0279622 A1 Sep. 9, 2021

(51) Int. Cl.
G06N 7/01 (2023.01)
G06F 40/205 (2020.01)
G06F 40/279 (2020.01)
G06F 40/30 (2020.01)
G06N 20/00 (2019.01)

(52) U.S. Cl.
CPC .............. *G06N 7/01* (2023.01); *G06F 40/205* (2020.01); *G06F 40/279* (2020.01); *G06F 40/30* (2020.01); *G06N 20/00* (2019.01)

(58) Field of Classification Search
None
See application file for complete search history.

(56) References Cited

PUBLICATIONS

Hakimov, S. et al., "AMUSE: multilingual semantic parsing for question answering over linked data," downloaded from <arxiv.org/abs/1802.09296> (Feb. 26, 2018) 16 pp. (Year: 2018).*
Khot, T. et al., "Exploring Markov logic networks for question answering," Proc. of the 2015 Conf. on Empirical Methods in Natural Language Processing (Sep. 2015) pp. 685-694. (Year: 2015).*
Minaee, S. et al., "Automatic question-answering using a deep similarity neural network," Global SIP (2017) pp. 923-927. (Year: 2017).*
Sheng, S. et al., "A markov network based passage retrieval method for multimodal question answering in the cultural heritage domain," MultiMedia Modeling: Proc. of the 24th Intl. Conf. (Feb. 5-7, 2018) 12 pp. (Year: 2018).*

(Continued)

*Primary Examiner* — Brian M Smith
(74) *Attorney, Agent, or Firm* — Shook, Hardy & Bacon L.L.P.

(57) ABSTRACT

Methods for natural language semantic matching performed by training and using a Markov Network model are provided. The trained Markov Network model can be used to identify answers to questions. Training may be performed using question-answer pairs that include labels indicating a correct or incorrect answer to a question. The trained Markov Network model can be used to identify answers to questions from sources stored on a database. The Markov Network model provides superior performance over other semantic matching models, in particular, where the training data set includes a different information domain type relative to the input question or the output answer of the trained Markov Network model.

20 Claims, 6 Drawing Sheets

(56) References Cited

PUBLICATIONS

Shuohang Wang, and Jing Jiang. A compare-aggregate model for matching text sequences. ICLR, 2017.

Ankur Parikh, Oscar Tackstrom, Dipanjan Das, and Jakob Uszkoreit. A decomposable attention model for natural language inference. EMNLP, 2016.

Jacob Devlin, Ming-Wei Chang, Kenton Lee, and Kristina Toutanova. BERT: Pre-training of Deep Bidirectional Transformers for Language Understanding. https://arxiv.org/abs/1810.04805, 2018.

Matthew Peters, Mark Neumann, Mohit Iyyer, Matt Gardner, Christopher Clark, Kenton Lee, Luke Zettlemoyer. Deep Contextualized Word Representations. NAACL, 2018.

Shuohang Wang, and Jing Jiang. Machine Comprehension Using Match-LSTM and Answer Pointer. https://arxiv.org/abs/1608.07905, 2016.

Hua He, and Jimmy Lin. Pairwise Word Interaction Modeling with Deep Neural Networks for Semantic Similarity Measurement. NAACL, 2016.

Wuwei Lan, and Wei Xu. Neural Network Models for Paraphrase Identification, Semantic Textual Similarity, Natural Language Inference, and Question Answering. COLING, 2018.

Michael Bendersky, Donald Metzler, and Bruce Croft. Learning Concept Importance Using a Weighted Dependence Model. WSDM, 2010.

Wanyun Cui, Yanghua Xiao, HaixunWang, Yangqiu Song, Seungwon Hwang, and Wei Wang. KBQA: Learning Question Answering over QA Corpora and Knowledge Bases. VLDB, 2017.

Weiguo Zheng, Jeffrey Xu Yu, Lei Zou, and Hong Cheng. Question Answering Over Knowledge Graphs: Question Understanding Via Template Decomposition VLDB, 2018.

Kangqi Luo, Fengli Lin, Xusheng Luo, and Kenny Q. Zhu. Knowledge Base Question Answering via Encoding of Complex Query Graphs. EMNLP, 2018.

Kun Xu, Siva Reddy, Yansong Feng, Songfang Huang, and Dongyan Zhao. Question Answering on Freebase via Relation Extraction and Textual Evidence. ACL, 2016.

Abdalghani Abujabal, Mohamed Yahya, Mirek Riedewald, and Gerhard Weikum. Automated Template Generation for Question Answering over Knowledge Graphs. WWW, 2017.

Xiao Huang, Jingyuan Zhang, Dingcheng Li, and Ping Li. Knowledge Graph Embedding Based Question Answering. WSDM, 2019.

Ruobing Xie, Zhiyuan Liu, Jia Jia, Huanbo Luan, and Maosong Sun. Representation learning of knowledge graphs with entity descriptions. AAAI, 2016.

Michael Kaisser. Answer Sentence Retrieval by Matching Dependency Paths Acquired from Question/ Answer Sentence Pairs. EACL, 2012.

Mohit Iyyer, Jordan Boyd-Graber, Leonardo Claudino, Richard Socher, and Hal Daume III. A Neural Network for Factoid Question Answering over Paragraphs. EMNLP, 2014.

Nikita Kitaev, and Dan Klein. Constituency Parsing with a Self-Attentive Encoder ACL, 2018.

Linfeng Song, Yue Zhang, Zhiguo Wang, and Daniel Gildea. N-ary Relation Extraction using Graph State LSTM. EMNLP, 2018.

Angrosh Mandya, Danushka Bollegala, Frans Coenen, and Katie Atkinson. Combining Long Short Term Memory and Convolutional Neural Network for Cross-Sentence n-ary Relation Extraction. https://arxiv.org/abs/1811.00845, 2018.

Helen Jiahe Zhao, and Jiamou Liu. Finding Answers from the Word of God: Domain Adaptation for Neural Networks in Biblical Question Answering. Helen Jiahe Zhao, Jiamou Liu, 2018.

Yi Yang, Wen-tau Yih, and Chris Meek. WikiQA: A Challenge Dataset for Open-Domain Question Answering. EMNLP, 2015.

Minwei Feng, Bing Xiang, Michael R. Glass, Lidan Wang, and Bowen Zhou. Applying deep learning to answer selection: a study and an open task. ASRU, 2015.

Bhaskar Mitra and Nik Craswell (2018), "An Introduction to Neural Information Retrieval", Foundatios and Trends in Information Retrieval: vol. 13, No. 1, pp. 1-26. DOI: 10.1561/1500000061.

* cited by examiner

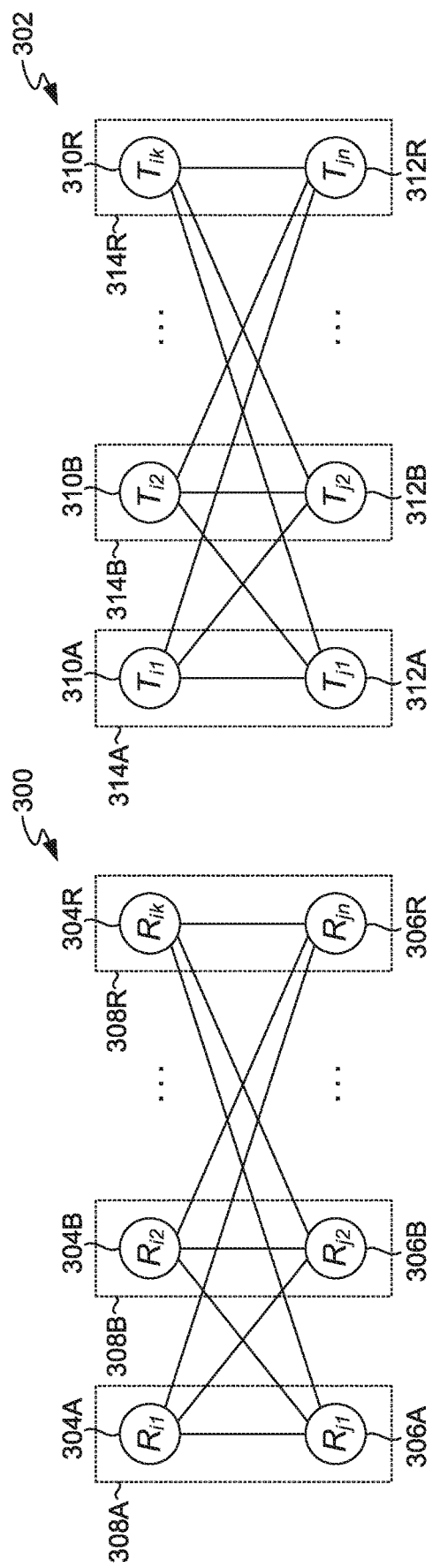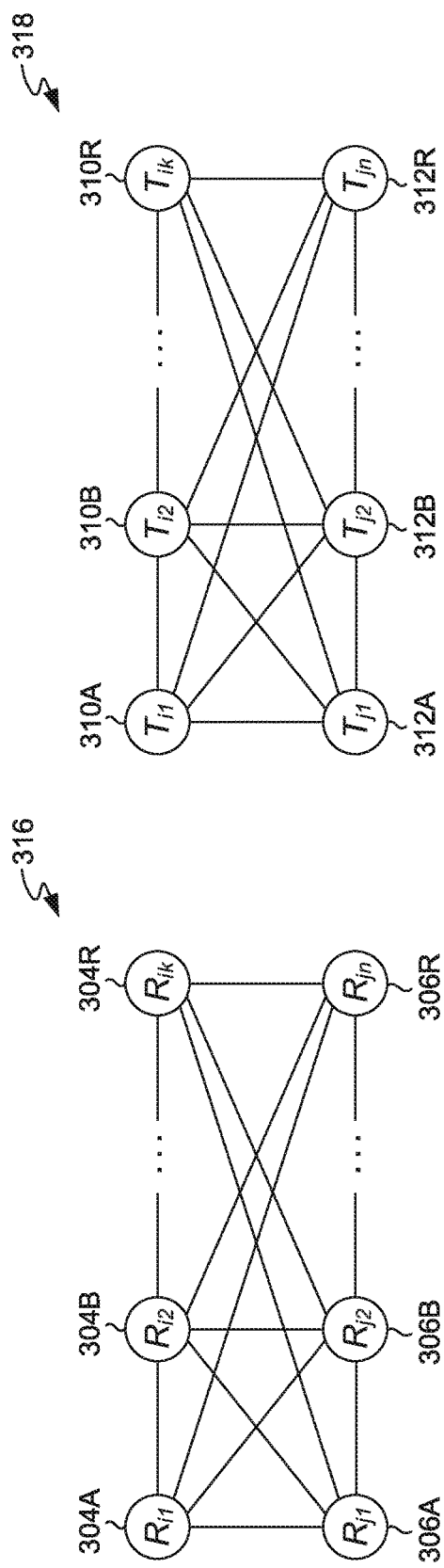
FIG. 3A.
FIG. 3B.

LEARNING WITH LIMITED SUPERVISION FOR QUESTION-ANSWERING WITH LIGHT-WEIGHT MARKOV MODELS

BACKGROUND

In recent years, the problem of natural language semantic matching has been getting a lot of attention, in particular when it is used by a computing device to try to determine a correct answer when posed with a question. This scenario frequently occurs where a user enters a question and the device is tasked with identifying a correct answer to that question, where the correct answer is generally just a portion of text from a data source.

Because of this, some have developed deep learning methods that are based on various types of deep neural networks. Models built using deep learning can be used for semantic representation to determine correct information in response to questions. However, most of these model structures are rigidly defined because they focus on either full-sentence modeling or word-level information. As a result, it is hard to adapt to diverse use-cases. That is, these models do not adapt well when retrieving answers from different information domain types. To work well, these techniques typically require large amounts of training data from the same domain type to which the trained model is applied.

Another branch of semantic matching that has been practiced to identify answers to questions is knowledge graph-based semantic matching and question answering. In this methodology, a user question is matched against an external knowledge base to get facts or answers for the question. This focuses on knowledge bases, which in many cases, are incomplete and do not contain answers to all the questions in the knowledge base. This ultimately limits the applications for these techniques.

SUMMARY

At a high level, aspects described herein relate to natural language semantic matching. The natural language semantic matching can be used to identify answers to questions, where the answer is a particular text that is retrieved and presented in response to a question. One method to semantically match answers to questions incudes training a Markov Network using question-answer pairs that include labels indicating a correct or incorrect answer to a question. A trained Markov Network model more accurately identifies correct answers to a question than do conventional methods.

The training data for the Markov Network can comprise question-answer pairs that are associated with a specific domain type, a non-specific domain type, or a combination of both. The domain type refers to the category of information with which the question-answer pairs are associated, such as question-answer pairs associated with medical data or question-answer pairs associated with insurance data. To utilize the training data, the question-answer pairs are parsed into object texts and relation texts. The object texts include words or phrases that relate to the meaning of the question or answer, and in many cases will comprise nouns. The relation texts include words or phrases that define relationships between objects associated with object texts. The relation texts will often include adjectives and verbs.

The parsed training data is used to generate a Markov Network for training. The resulting trained Markov Network model is used to identify answers when input with a question. The trained Markov Network model outperforms conventional methods, in particular, where the training data comprises a non-specific domain type, and the input question and identified answer relate to a specific domain type. Illustrated as a working example, the question-answer pairs of the training data may include general information not associated with a particular domain type, while the input question and the identified answer relate to a specific domain type, such as healthcare or insurance information. Upon identifying an answer to a question, the identified answer can be presented at a user device in response to receiving the question.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description which follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein:

FIGS. 3A-3B are example Markov Networks determined by the natural language semantic matching system of FIG. 2, in accordance with an aspect described herein;

DETAILED DESCRIPTION

Definitions

Figure 1:
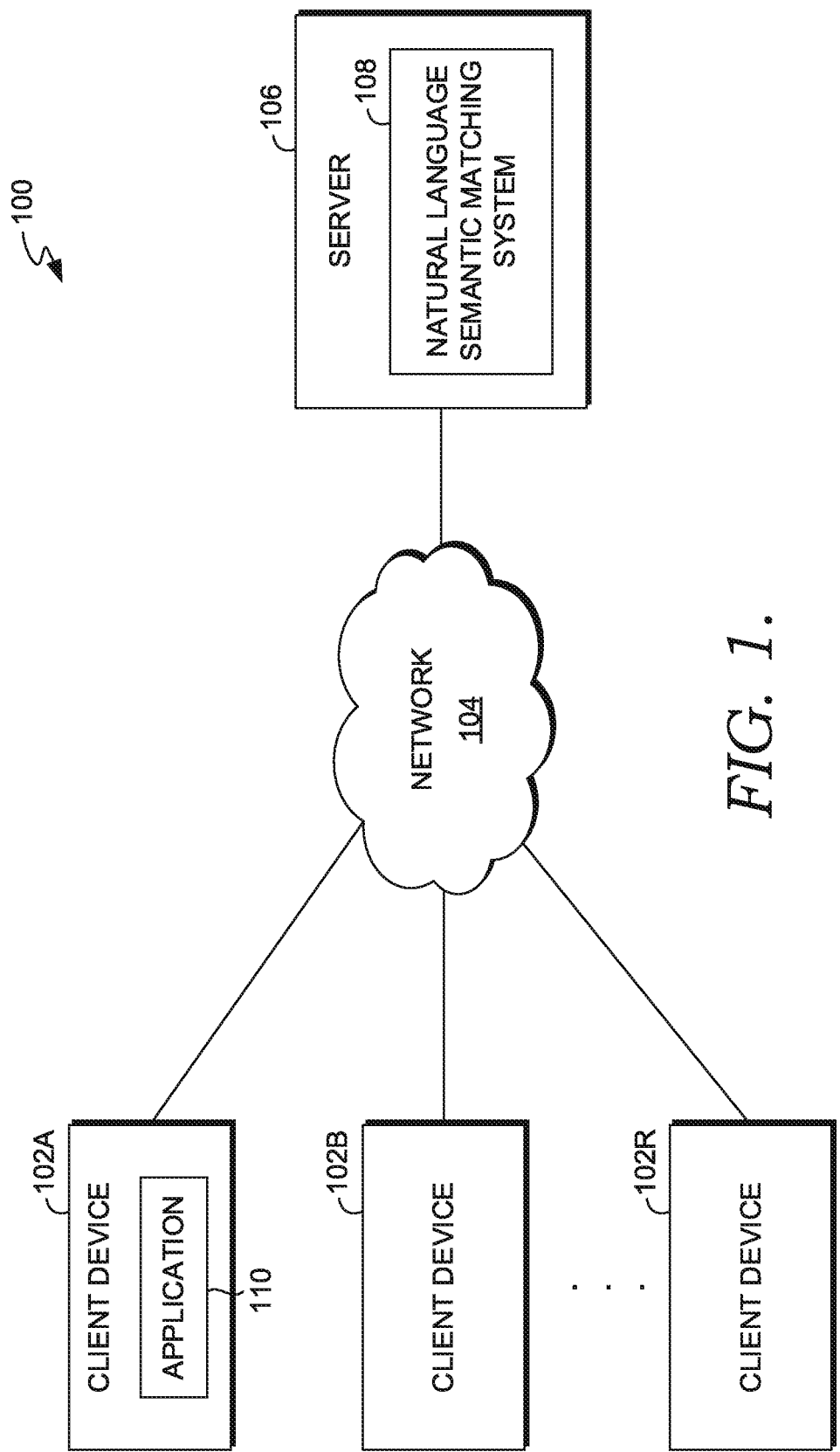
FIG. 1 is a block diagram of an example operating environment suitable for employing a natural language semantic matching system, in accordance with an aspect described herein.

Various terms are used throughout this description. Definitions of some terms are included below to provide a clearer understanding of the ideas disclosed herein.

A "Markov Network" generally refers to a type of undirected graphical model that is usable with machine learning methods and, among other things, generally models sequential, spatial, or relational interactions.

A "trained Markov Network model" as used herein is the output of training a Markov Network using training data.

A "domain type," as referred to throughout, generally means a category of information. For example, a healthcare domain type refers to data that includes healthcare related information. Data that relates to multiple categories of information has a "non-specific domain type," while data that primarily includes a specific category of information has a "specific domain type."

"Question-answer pairs," as used throughout, generally mean a "question" that has an associated "answer." "Question," however, is not meant to impart a particular grammatical requirement. A question can be any word or phrase. For example, a single word entered as a search query at a search engine is a "question" in the sense that a user is asking for a response to the input. An "answer" is any response to a question, regardless whether the response would be considered correct or incorrect with respect to the question.

"Object text" generally describes any text or text phrase that represents an object. An "object" relates to the meaning, or "object," of the text. That is, an object describes to what or to whom the text relates. In many cases, object text will be nouns. "Relation text," however, describes any text or text phrase that defines a relationship between object text, and in many cases, will include adjectives, verbs, and prepositions. As an example, the sentence, "King John ruled England during the Medieval time" includes three objects, "King John," "England," and "Medieval time," which relates to the meaning of the sentence. The relation text imparts a relationship on the object text, and includes "ruled" and "during."

A "node" generally describes a variable within the Markov Network. A node can be a variable that is a representation of relation text, which is termed "relation node." A node can also be a representation of object text. These nodes are referred to as "object nodes."

"Cliques" are generally groups of nodes. A "binary clique" is a group of two nodes that are dependent on one another.

Overview

As indicated in the Background, some systems are available to semantically identify and match answers to questions. These conventional systems, however, fall short in a number of ways. In particular, deep learning methods alone are sensitive to the domain types that are associated with the training data. That is, when deep learning models are trained on non-specific domain types, the resulting trained model does a poor job of identifying correct answers to questions of a specific domain type. Thus, where deep learning models are trained on general information question-answer pairs, the trained deep learning models do a relatively poor job of identifying specific domain type answers to questions, such as receiving a question related to insurance and identifying a correct answer from data sources associated with insurance, such as insurance documents.

Another conventional method uses knowledge graph-based semantic matching. This method uses question answering over knowledge base to extract answers from graph-like knowledge bases. Here, a user question is matched against an external knowledge base. Many knowledge bases, however, are incomplete or do not contain a correct answer to a given question. As such, this method is dependent upon the completeness of a given knowledge base for a specific domain. Thus, the accuracy of identifying correct answers fails in many cases due to incompleteness of knowledge-base data.

The technology described herein provides for systems that address these technical challenges by more accurately identifying and recalling correct answers to questions from within a data source, such as a document, stored on a database. The method provides further benefits by allowing for limited training supervision using question-answer pairs that are associated with a non-specific domain type or are associated with only a limited amount of specific domain type information. The present technology more accurately identifies and recalls correct answers where the question-answer pairs of the training data are associated with a non-specific domain type, while an input question and output answer are associated with a specific domain type.

The limited supervision of the Markov Network allows training to take place using a non-domain type or limited specific domain type training data. This is beneficial where questions are directed to a specific domain type in which training data cannot be easily accessed. Take for instance insurance records held by an insurance company. There is likely little to no labeled question-answer pair training data, such as previously asked questions with an associated answer, where the question-answer pairs have labels that indicate whether the answer is correct with respect to the question. As such, conventional methods would have relatively poor accuracy in identifying correct answers, since the model cannot be trained on a large amount of training data having the same domain type—in this case, labeled question-answer pairs from the insurance data. Further, since the knowledge base of insurance information is not complete with correct question-answer pairs, then conventional methods using knowledge graph-based semantic matching are also limited in applicability. The present semantic matching method using a trained Markov Network model would more accurately identify correct questions from the insurance data, even when it is trained using no insurance domain specific data or a limited amount of insurance domain specific data.

One example method for semantic matching of answers to questions using Markov Models begins by training the Markov Network on training data of question-answer pairs to determine a trained Markov Network model. The training data can comprise questions that have associated answers, which are labeled to indicate whether the answer to the question is considered correct. Question-answer pairs that are used as training data can be of a specific domain type, a non-specific domain type, or a combination of both.

On receiving the training data, the question-answer pairs can be parsed to identify object texts and relation texts within the question-answer pairs. Thus, a question is parsed to identify relation texts that are associated with the question, and an answer to the question is parsed to identify relation texts within the answer. In the same manner, object texts associated with the question and object texts associated with the answer to the question are also identified.

The identified object texts and relation texts can be used to generate a Markov Network for training, resulting in a trained Markov Network model. The Markov Network is generated by forming a relation side structure and an object side structure, each having nodes of the network that respectively represent relation texts and object texts. The nodes of the relation side structure include relation binary cliques that each have a relation first node for a first relation text identified from a question and a relation second node for a second relation text identified from an answer of the question-answer pair. Within the relation side structure, each relation first node of the plurality of relation binary cliques is dependent upon each relation second node of the plurality of relation binary cliques.

The nodes of the object side structure are similarly arranged into object binary cliques that each have an object first node for a first object text identified from a question and an object second node for a second object text identified from an answer of the question-answer pair. Each object first node of the plurality of object binary cliques is dependent upon each object second node of the plurality of object binary cliques.

The Markov Network is further provided with a feature function. The feature function describes a probability in the form of outputting a probability score that indicates a similarity between the relation binary cliques and the object binary cliques. In an example, a deep neural network may be used as the feature function.

The Markov Network can then be optimized to produce a trained Markov Network model. Optimization of the Markov Network can be done by jointly optimizing parameters of the Markov Network and the feature function using a maximum likelihood estimation. The resulting trained Markov Network model may be stored for use in identifying answers to questions. The trained Markov Network model can identify answers within a specific domain type.

To use the trained Markov Network model, a question is received by a client device. The question may pertain to a specific domain type, such as insurance, healthcare, etc. The trained Markov Network model receives the input question, and in response, identifies an output answer to the question. The answer may also be associated with a specific domain type. The domain type of the question and answer can be different from the training data domain type. The trained Markov Network model outperforms conventional information recall methods, such as those previously discussed, and in particular, significantly outperforms conventional methods when the training data domain type is different from the input question and output answer domain type. Once identified, the answer can be provided back to the client device for display.

Example Natural Language Semantic Matching System

FIG. 1 depicts a block diagram of example operating environment 100, which is suitable for use in implementing the described technology. Generally, operating environment 100 is suitable for natural language semantic matching using a Markov Network. The example operating environment 100 of FIG. 1 is illustrated having client devices 102A and 102B through 102R, which are in communication via network 104 to server 106. Client device 102B is illustrated as having an ellipsis drawn between it and client device 102R, which is meant to indicate that any number of client devices may be associated with operating environment 100. As further described below, the arrangement is only an example. In another arrangement, one or more of client devices 102A and 102B through 102R may comprise server 106. Each of the components illustrated may be implemented via any type of computing device, such as computing device 600 described in connection to FIG. 6.

Client devices, such as client devices 102A through 102R, can be any type of computing device capable of being operated by a client, which may be any person or entity that generates or uses semantic matching methods described herein.

Figure 6:
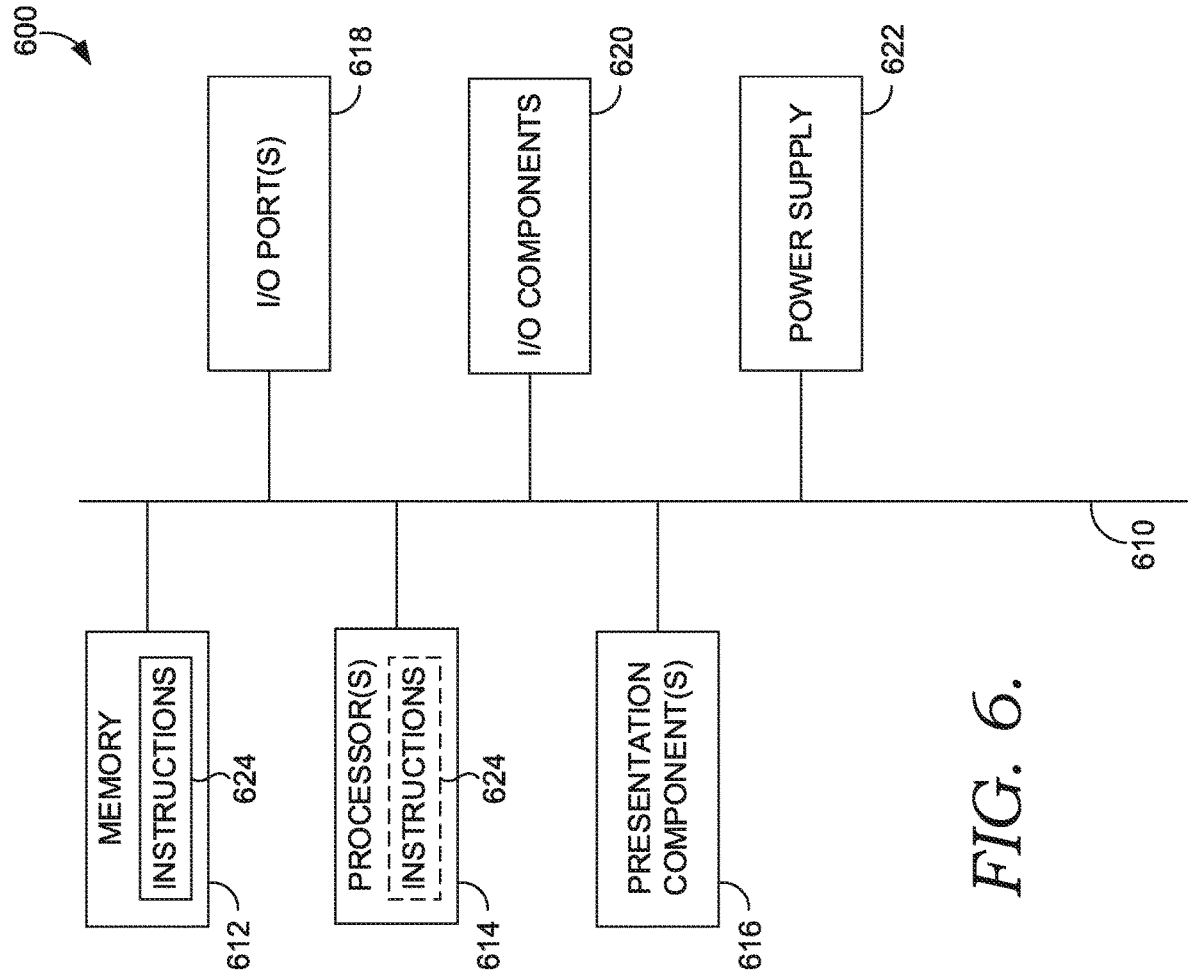
FIG. 6 is a block diagram of an example operating environment in which embodiments of the present technology may be employed.

In some implementations, client devices 102A through 102R are the type of computing device described in relation to FIG. 6. For example, client device 102A may be embodied as a personal computer (PC), a laptop computer, a mobile device, a smartphone, a tablet computer, a smart watch, a wearable computer, a personal digital assistant (PDA), a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device. Although reference has been made only to client device 102A, it is intended here and throughout this disclosure that client devices 102B through 102R are equally considered.

Client device 102A can include one or more processors and one or more computer-readable media. The computer-readable media may include computer-readable instructions executable by the one or more processors. The instructions may be embodied by one or more applications, such as application 110, shown in FIG. 1. Application 110 is referred to as a single application for simplicity, but its functionality can be embodied by one or more applications in practice.

Application 110 is generally capable of facilitating the exchange of information between client devices 102A through 102R or server 106. For example, application 110 facilitates receiving information, such as inputs associated with generating a trained natural language sematic model or an input for utilizing the trained natural language semantic model. Application 110 may provide information received from client devices 102A through 102R and server 106, such as an output of the natural language semantic model.

In some implementations, application 110 comprises a web application, which can run in a web browser, and could be hosted at least partially on the server-side of operating environment 100. Application 110 can comprise a dedicated application, such as an application having analytics functionality. In some cases, application 110 is integrated into the operating system (e.g., as a service or program). It is contemplated that "application" be interpreted broadly. In some embodiments, application 110 may be integrated with natural language semantic matching system 108, which is illustrated as residing on server 106.

Server 106 generally supports natural language semantic matching system 108. Server 106 includes one or more processors, and one or more computer-readable media. The computer-readable media includes computer-readable instructions executable by the one or more processors. The instructions may optionally implement one or more components of natural language semantic matching system 108, described in additional detail below with reference to FIG. 2.

Figure 2:
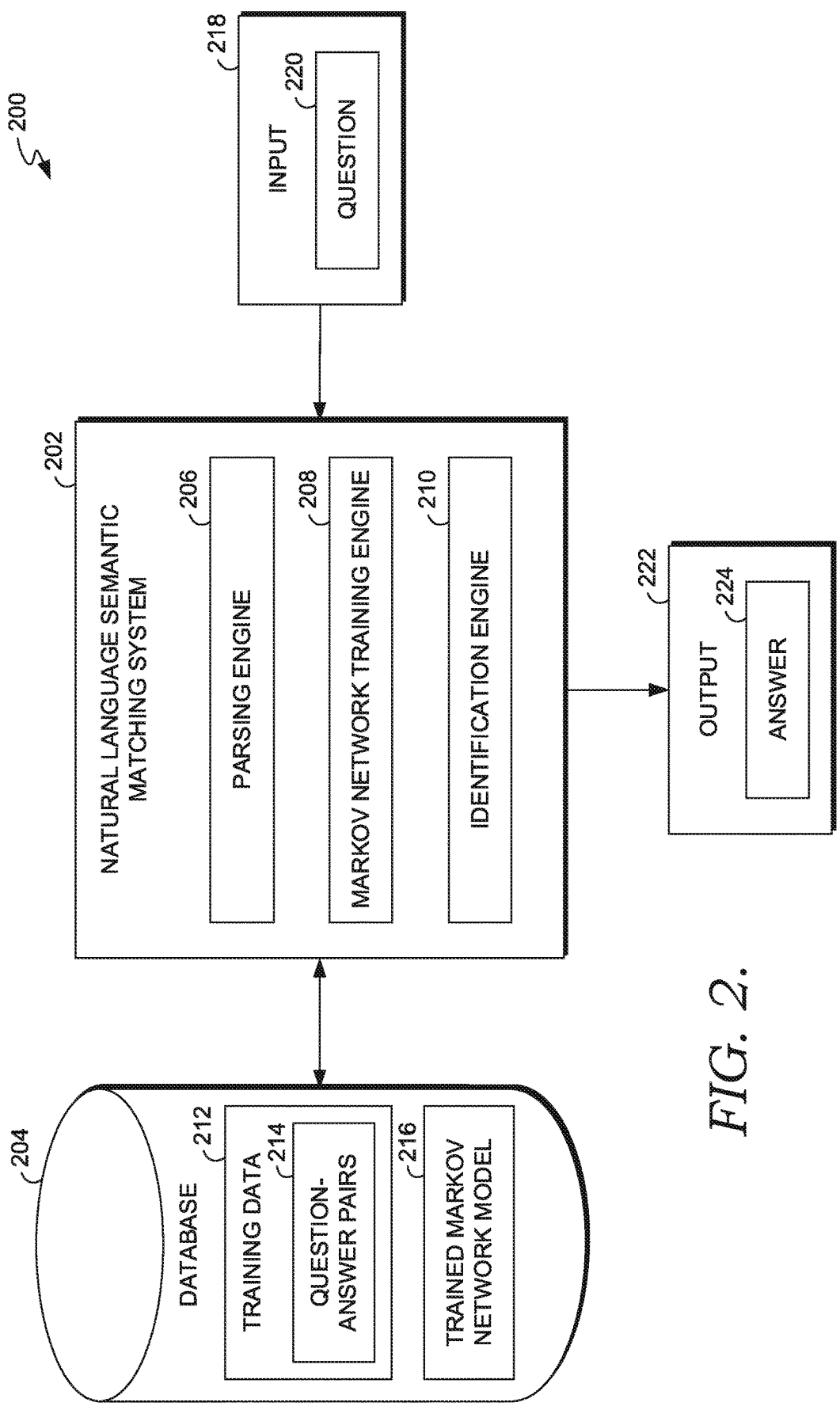
FIG. 2 is a block diagram of an example natural language semantic matching system, in accordance with an aspect described herein.

It should be appreciated that while natural language semantic matching system 108 is depicted as a single system, it can function as multiple systems capable of performing all the attributes that are described in conjunction with FIG. 2.

With reference now to FIG. 2, block diagram 200 of example natural language semantic matching system 202 is provided. FIG. 2 is just one example arrangement suitable for using the technology; however, other arrangements are sufficient for use as well. Natural language semantic matching system 202 is one example system suitable for implementing the technology described herein and may be employed as natural language semantic matching system 108 of FIG. 1

Natural language semantic matching system 202 is shown in communication with database 204. Database 204 generally stores information including data, computer instructions (e.g., software program instructions, routines, or services), or models used in embodiments of the described technologies. Although depicted as a single database component, database 204 may be embodied as one or more data stores or may be in the cloud. One example of the data store is ADOBE® Data Warehouse. An example suitable for use is memory 612 of FIG. 6.

In general, natural language semantic matching system 202 generates a trained Markov Network model and uses the trained Markov Network model to identify answers to questions. Natural language semantic matching system 202 comprises parsing engine 206, Markov Network training engine 208, and identification engine 210.

Natural language semantic matching system 202 receives training data 212 stored on database 204. Training data 212 comprises question-answer pairs 214. Question-answer pairs 214 include questions that have associated answers. The word "pair" is not meant to impart a 1-to-1 requirement for questions and answers, only that a question has an associated answer. That is, a single question may have many different answers. Of the answers, some could be considered incorrect answers to the question, while others would be correct answers. Here, one question with multiple answers can still be included in question-answer pairs 214 in that a question-answer pair exists for the question and a first answer, and another question-answer pair exists for the question and a second answer, and so forth.

Question-answer pairs 214 can include a label associated with each question-answer pair. All question-answer pairs of question-answer pairs 214 may each comprise a label, or only a portion of question-answer pairs 214 may comprise a label. The label indicates whether the answer associated with the question of a question-answer pair is correct. Thus, for some implementations, a binary label can be used, such as a "1" or "0" to indicate whether the answer is correct or incorrect.

Question-answer pairs 214 can be of a specific domain type, a non-specific domain type, or a combination of both. That is, training data 212 can include question-answer pairs 214 that relate to a specific type of information, general information that is not related to a specific information type, or a combination where a percentage of information relates to a specific information type and the remainder is not related to the specific information type. While a domain type can be any category of information, some examples include insurance information and healthcare information. Using insurance information as an example domain type, question-answer pairs 214 may all relate specifically to insurance information, or only a portion of question-answer pairs 214 may relate to insurance information. When only a portion of question-answer pairs 214 relates to a specific domain type, the portion of specific domain type question-answer pairs can be any percentage of training data 212. In some cases, question-answer pairs 214 may not be related to any specific domain type. That is, if a model trained on question-answer pairs 214 is used to identify answers within insurance information, question-answer pairs 214 may not include questions and answers that relate to insurance information.

Question-answer pairs 214 of training data 212 suitable for use with the described technology can be generated from various sources. One method of generating training data 212 is to collect crowdsourced questions that have associated answers. For instance, questions posted by users on the Internet, such as Yahoo! Answers or another forum, will typically have answers that are provided by other users. In many cases, the forum provides an opportunity to rate answers to questions. Likely, higher rated answers will be considered correct, while lower rated answers might be considered incorrect. Thus, a label can be applied to question-answer pairs in this manner. Such questions and answers can be harvested from various sources across the Internet and stored in database 204 as question-answer pairs 214 to be used as training data 212. Another method for generating training data 212 is to collect pre-labeled question-answer pairs from various online sources. One such source that may be used is The Stanford Question Answering Dataset, which at the time of filing this application, is available as SQuAD2.0 at https://rajpurkar.github.io/SQuAD-explorer/. Pre-labeled question-answer pairs that relate to various domain types or are related to a non-specific domain can be collected from The Stanford Question Answering Dataset, along with other similar datasets, and stored as training data 212.

Parsing engine 206 of natural language semantic matching system 202 generally parses the text of question-answer pairs 214 of training data 212. In parsing the text of question-answer pairs 214, parsing engine 206 identifies relation texts and object texts. The object texts include words or word phrases that represent objects, which relate to the meaning of the sentence. These often include nouns. Parsing engine 206 further identifies relation texts, which are words or word phrases that define relationships between objects. The relation texts often include verbs, adjectives, and prepositions.

The way text is represented in terms of object texts and relation texts is similar to first order logic. This provides a more natural and intuitive way for light-weight semantic representation by capturing the meaning of a sentence in a non-complex manner. An example text recites, "King John ruled England during the medieval time." Here, the text can be parsed into object texts that include "King John," "England," and "medieval time," and parsed into relation texts that include "ruled" and "during." Another example text recites, "John was the King that controlled England during the medieval time." This sentence can be parsed into object texts that include "John," "King," "England," and "medieval time" and into relation texts that include "controlled" and "during." Each example comprises first-order relation texts and object texts from the sentences. For example, "ruled" defines a relation between "King John" and "England," while "during" defines a relation between "King John" and "medieval time." Based on the first-order relationship, it can be concluded that the second example follows from the first, as their relation texts and object texts match or are similar.

Parsing engine 206 may comprise various methods or systems to identify the object texts and the relation texts from question-answer pairs 214. As examples, natural language parsers such as spaCy, Natural Language Toolkit, Apache OpenNLP, Genism, Mallet, and the like can be used as a basis for identifying the object texts and relation texts.

Question-answer pairs 214 of training data 212 that have been parsed into object texts and relation texts are utilized by Markov Network training engine 208 to produce a trained Markov Network model. Markov Network training engine 208 generates a Markov Network based on the object texts and relation texts. Two examples of Markov Networks that can be generated by Markov Network training engine 208 are illustrated in FIGS. 3A-3B. It should be appreciated that other Markov Network arrangements can be generated and that those provided in FIGS. 3A-3B are just examples. Each and every Markov Network arrangement cannot be practically described herein, and as such, the inventors intend that other arrangements are included within the scope of the description. Having this in mind, reference is now made to Markov Network training engine 208 of FIG. 2 and to the example Markov Networks provided in FIGS. 3A-3B.

For semantic matching generally, the similarity between a question-answer pair is determined. As an example to be used in conjunction with FIGS. 3A-3B, a question-answer pair is represented as $S_i$ and $S_j$, with $S_i$ being a first text comprising a first set of words and $S_j$ being a second text comprising a second set of words. Using this designation, $S_i$ represents a question and $S_j$ represents an answer associated with the question in a question-answer pair of question-answer pairs 214. Although $S_i$ and $S_j$ may respectively represent a question and an answer, this nomenclature is not intended to impart any particular grammatical constraint or requirement.

Markov Networks can be used as a general framework for modeling text pairs determined from $S_i$ and $S_j$, such as relation text pairs and object text pairs. Relation text pairs are determined from a relation text of the question ($S_i$) and a relation text of the answer ($S_j$) to the question for a particular question-answer pair of question-answer pairs 214. Likewise, object text pairs are determined from an object text of the question ($S_i$) and an object text of the answer ($S_j$) to the question. Text pairs may be generated for all or a portion of question-answer pairs 214 of training data 212.

Markov Network training engine uses a set of variables that is based on the text pairs determined from $S_i$ and $S_j$. In continuing with the same example, the set of variables is termed $R_i$, $T_i$, $R_j$, and $T_j$. Here, $R_i$ denotes a relation text from $S_i$, while $T_i$ denotes an object text from $S_i$. Similarly, $R_j$ denotes a relation text from $S_j$, while $T_j$ denotes an object text from $S_j$. The Markov Networks of FIGS. 3A-3B are models that describe the joint distribution of the set of variables $R_i$, $T_i$, $R_j$, and $T_j$.

Each variable of the set of variables can be utilized as a node within the Markov Network. The Markov Network defines a joint distribution of the set of variables, which can also be viewed as a partition of the set of variables. The nodes of the Markov Network form cliques, which are generally a connected set of nodes. Within the Markov Network, nodes that are connected to one another are dependent on each other. That is, the variable represented by a first node is dependent on the variable represented by a second node to which it is connected. In this same way, a binary clique is a connected set of two nodes. For simplicity, when describing dependencies, only one node may be described as dependent on another node. However, this is intended to mean that both nodes are dependent on each other. For example, a first node that is dependent on a second node also means that the second node is dependent on the first node. Therefore, the variable of the first node is dependent on the variable of the second node, just as the variable of the second node is dependent on the first.

Continuing with the same example, a binary clique of the Markov network generated by Markov Network training engine 208 includes a first node that represents text from $S_i$ and a second node representing text from $S_j$. Further, the binary cliques comprise nodes of the same text type. That is, a binary clique can include a first node $R_i$ and a second node $R_j$, representing relation texts from a question-answer pair (termed a "relation binary clique"), or a first node $T_i$ and a second node $T_j$ that represent object texts from a question-answer pair (termed an "object binary clique").

Markov Network training engine 208 can further define a set of non-negative potential functions on cliques of the Markov Network. The potential functions are used to score similarity between members of each clique. In this way, semantic similarity between $S_i$ and $S_j$ is defined by the joint probability of the relation binary cliques and the objet binary cliques as computed by the individual clique potential functions.

As discussed earlier, feature functions score the similarity between nodes of each of the cliques. The potential functions are orthogonal to the Markov Network, meaning that the Markov Network allows for different types of potential functions. As examples, deep learning methods, such as fully connected neural networks, convolutional neural networks, recurrent neural networks, generative adversarial networks, deep reinforcement learning, ELMo, long short-term memory, and the like may be used as potential functions. Suitable potential functions can include information retrieval methods, such as latent semantic analysis, deep neural networks, learning to rank, and the like. These are just a few examples of potential functions that may be suitable for use with the present technology. However, as some of the Markov Networks described throughout this disclosure are orthogonal with respect to the feature function, other methods and functions will also be suitable for use. It is intended that the scope of this disclosure covers such methods, since describing every method would be impracticable.

In continuing with the example presented in the figures, the remainder of this disclosure describes deep neural networks for use as the potential function for each of the cliques. In particular, Bidirectional Encoder Representations from Transformations (BERT) is described for use as the potential function. BERT, as described in the context of semantic matching, is essentially a softmax function that can take each text pair as an input to produce a probability score that describes the similarity between texts of a text pair.

To more fully describe how Markov Network training engine 208 generates and trains a Markov Network to provide a trained Markov Network model, specific reference is made to node networks of the example Markov Networks described in FIGS. 3A and 3B, which relate to the question-answer pair represented as $S_i$ and $S_j$, described previously.

The Markov Network of FIG. 3A comprises relation side structure 300. Relation side structure 300 is formed of relation nodes, such as relation nodes 304A-R and 306A-R. Each relation node is a variable of the set of variables and represents a relation text of the question-answer pair. Each relation node is included in a relation binary clique, such as relation binary cliques 308A-308R. Ellipses are illustrated in FIG. 3A between relation nodes 304B and 304R, along with 306B and 306R. This is intended to illustrate that any number of relation nodes may be present in the Markov Network, forming any number of relation binary cliques. Similar illustrations and terminology will be used throughout this disclosure in conjunction with this and other figures.

Each relation binary clique has a relation node pair that comprises a relation first node and a relation second node that are dependent on one another. Here, relation first nodes are derived from relation texts in a question and the relation second nodes are derived from relation texts in an answer to the question of the question-answer pair. The relation first nodes comprise relation nodes 304A-304R, while the relation second nodes comprise 306A-306R. Thus, relation binary clique 308A is formed from relation first node 304A and relation second node 306A, relation binary clique 308B is formed from relation first node 304B and relation second node 306B, and so forth until relation binary clique 308R is formed from relation first node 304R and relation second node 306R.

Within relation side structure 300, each relation first node is dependent on each relation second node. Dependency is illustrated by a solid black line connecting dependent nodes. While there are numerous dependencies illustrated, an example includes relation first node 304A having a dependency to relation second node 306A (based on being part of relation binary clique 308A), along with each of relation second nodes 306B through 306R. Another example includes relation first node 304B having a dependency to relation second nodes 306A-306R, including relation second node 306B (based on being part of relation binary clique 308B).

As noted, each of the relation nodes is a variable. With regard to the question-answer pair of $S_i$ and $S_j$, relation first node 304A illustrates variable $R_{i1}$, which represents a first relation text from $S_i$; relation first node 304B illustrates variable $R_{i2}$, which represents a second relation text from $S_i$; and relation first node 304R illustrates variable $R_{ik}$, which represents an $n^{th}$ relation text from $S_i$. Relation second node 306A illustrates variable $R_{j1}$, which represents a first relation text from $S_j$; relation second node 306B illustrates variable $R_{j2}$, which represents a second relation text from $S_j$, and relation second node 306R illustrates variable $R_{jn}$, which represents an $n^{th}$ relation text from $S_j$.

The Markov Network of FIG. 3A further comprises object side structure 302. Object side structure 302 is formed of object nodes, such as object nodes 310A-310R and 312A-312R. Each object node is a variable of the set of variables and represents an object text of the question-answer pair. Each object node is included in an object binary clique, such as object binary cliques 314A-314R.

Each object binary clique has an object node pair that comprises an object first node and an object second node that are dependent on one another. Here, object first nodes are derived from object texts in the question, and the object second nodes are derived from object texts in the answer of the question-answer pair. The object first nodes comprise object first nodes 310A-310R, while the object second nodes comprise object second nodes 312A-312R. Thus, object binary clique 314A is formed from object first node 310A and object second node 312A, object binary clique 314B is formed from object first node 310B and object second node 312B, and so forth until object binary clique 314R is formed from object first node 310R and object second node 312R.

Each object first node is dependent on each object second node. Although there are numerous dependencies illustrated within object side structure 302, an example includes object first node 310A having a dependency to object second node 312A (based on being part of object binary clique 314A), along with each of object second nodes 312B through 312R. Another example includes object first node 310B having a dependency on object second nodes 312A-312R, including object second node 312B (based on being part of object binary clique 314B).

Again with regard to the question-answer pair of $S_i$ and $S_j$, object first node 310A illustrates variable $T_i$, which represents a first object text from $S_i$; object first node 310B illustrates variable $T_{i2}$, which represents a second object text from $S_i$; and object first node 310R illustrates variable $T_{ik}$, which represents an $n^{th}$ object text from $S_i$. Object second node 312A illustrates variable $T_{j1}$, which represents a first object text from $S_j$; object second node 312B illustrates variable $T_{j2}$, which represents a second object text from $S_j$, and object second node 312R illustrates variable $T_{jn}$, which represents an $n^{th}$ object text from $S_j$.

Referencing now FIG. 3B, the example Markov Network provided includes optional dependencies between neighboring nodes. As illustrated, FIG. 3B includes relation side structure 316, which illustrates the same element number for relation first nodes 304A-304R and relation second nodes 306A-306R that were presented in FIG. 3A. As illustrated in FIG. 3B, each of relation first nodes 304A-304R is dependent on adjacent relation first nodes, while each of relation second nodes 306A-306R is dependent on adjacent relation second nodes. Each of object first nodes 310A-310R is dependent on adjacent object first nodes, while each of object second nodes 312A-312R is dependent on adjacent object second nodes.

Within relation side structure 316, each relation first node 304A-304R has a relative position among relation first nodes 304A-304R. That is, relation first node 304A is adjacent to relation first node 304B and is two relation first nodes away from another relation first node for variable $R_{i3}$ (not illustrated). Relation first node 304A is three relation first nodes away from yet another relation first node for variable $R_{i4}$ (not illustrated), and so forth. Using another example, relation first node 304B is adjacent to relation first node 304A and another relation first node for variable $R_{i3}$ (not illustrated). Similarly, each of relation second nodes 306A-306R has a relative position among relation second nodes 306A-306R. Where, relation second node 306A is adjacent to relation second node 306B and is two relation second nodes away from another relation second node for variable $R_{j3}$ (not illustrated). Relation second node 306A is three relation second nodes away from yet another relation second node for variable $R_{j4}$ (not illustrated), and so forth. Using another example, relation second node 306B is adjacent to relation second node 306A and another relation second node for variable $R_{j3}$ (not illustrated).

Object side structure 318 includes a similar arrangement for the object nodes. Within object side structure 318, each object first node 310A-310R has a relative position among object first nodes 310A-310R. That is, object first node 310A is adjacent to object first node 310B and is two object first nodes away from another object first node for variable $T_{i3}$ (not illustrated). Object first node 310A is three object first nodes away from yet another object first node for variable $T_{i4}$ (not illustrated), and so forth. Using another example, object first node 310B is adjacent to object first node 310A and another object first node for variable $T_{i3}$ (not illustrated). Similarly, each of object second nodes 312A-312R has a relative position among object second nodes 312A-312R. Where, object second node 312A is adjacent to object second node 312B and is two object second nodes away from another object second node for variable $T_{j3}$ (not illustrated). Object second node 312A is three object second nodes away from yet another object second node for variable $T_{j4}$ (not illustrated), and so forth. Object second node 312B is adjacent to object second node 312A and another object second node for variable $T_{j3}$ (not illustrated).

The relative position of nodes within the Markov Network can represent the relative position of texts in the question-answer pair. For example, where a relation text of a question is adjacent to another relation text of the question, the nodes for the variables representing each relation text can also be adjacent. Likewise, where a relation text is two relation texts away from another relation text in the question, the nodes for the variables representing each relation text can be two nodes away. This relationship is similar for object nodes and object texts of the object side structure. Thus, a relative position of each of the relation first nodes and second nodes is determined from a relative position of each of the relation texts within a question-answer pair, while a relative position of each of the object first nodes and object second nodes is determined from a relative position of each of the object texts within the question-answer pair.

In this way, FIG. 3B illustrates the additional dependency between texts within the same sentence. Texts close to each other within the same sentence are more likely to be related, meaning that the texts have a temporal correlation. Thus, when determining similarity between a pair of text, the neighboring relations (represented by the relative position of the nodes) are taken into account. For example, if the neighbor of relation first node 304R ($R_{ik}$) is similar to relation second node 306R ($R_{jn}$), then relation first node 304R ($R_{ik}$) is similar to relation second node 306R ($R_{jn}$) by temporal correlation. For simplicity, the remainder of this discussion considers immediate neighbors in question-answer pairs, which relate to adjacent nodes within the Markov Network.

In continuing with the $S_i$ and $S_j$ sentence pair, and the Markov Networks of FIGS. 3A and 3B, similarity between text pairs $S_i$ and $S_j$ can be given by:

$$\text{Score}(S_i, S_j) = P(\{R_i\}, \{T_i\}, \{R_j\}, \{T_j\}) = \frac{1}{Z} \prod_R \phi_R(x_R) \prod_o \phi_o(x_o)$$

Here, ØR denotes the clique feature function defined on relation binary clique $x_R$, while $\phi_O$ is similarly defined for object binary clique $x_O$. The Z term in the equation is a normalization constant. Substituting individual components of each clique into the equation provides the following:

$$\text{Score}(S_i, S_j) = \frac{1}{Z} \prod_{<x,y> \in V_R} \phi_R(R_{ix}, R_{jy}) = \prod_{<x,y> \in V_O} \phi_T(T_{ix}, T_{jy})$$

$V_R$ and $V_O$ contain enumerations of relation and object pairs between the $S_i$ and $S_j$ sentence pair. Potential is often represented by a log-linear combination of a set of feature functions, as represented in the following:

$$\phi_R(R_{ix}, R_{jy}) = \exp(w \cdot f(R_{ix}, R_{jy}))$$

$$\phi_O(T_{ix}, T_{jy}) = \exp(w' \cdot f(T_{ix}, T_{jy}))$$

Here, w and w' denote parameters on the feature functions f and f' that are defined on the relation binary cliques and the object binary cliques, respectively. Each feature function is an exponentiated weighted sum of feature functions. As previously noted the choice of feature functions is orthogonal to the framework.

The joint distribution (similarity score) can then be represented using the log-linear format:

Log(score)=$w \cdot f(R_i, R_j) + w' \cdot f(T_i, T_j) - \log Z$

Notably, although this conflates some notations for simplicity, w refers to a collection of all weights for the feature functions defined on the relation binary cliques represented by $f(R_i, R_j)$, and w' represents the collection of all weights for the feature functions defined on the object binary cliques $f'(T_i, T_j)$.

To incorporate the neighborhood information, for example, the temporal correlations illustrated in and described in conjunction with FIG. 3B, the feature function $f$ defined on pairs of relation nodes to include the influence from neighbors is represented in the following:

$$f_t(R_{ix}, R_{jy}) = f(R_{ix}, R_{jy}) + \sum_{k \in nb(R_{ix})} f(R_{ik}, R_{jy}) + \sum_{k \in nb(R_{jy})} f(R_{ix}, R_{jk})$$

Thus, where $R_{ix}$ and $R_{jy}$ respectively denote the relation text pairs from $S_i$ and $S_j$, $nb(R_{ix})$ denotes the immediate neighbors of $R_{ix}$ in $S_i$, while $nb(R_{jy})$ denotes the immediate neighbors of $R_{jy}$ in $S_j$.

The new feature function for objects that accounts for temporal correlation becomes:

$$f'_t(T_{ix}, T_{jy}) = f'(T_{ix}, T_{jy}) + \sum_{k \in nb(T_{ix})} f'(T_{ik}, T_{jy}) + \sum_{k \in nb(T_{jy})} f'(T_{ix}, T_{jk})$$

$f'$ denotes the feature function defined on object text pairs. Thus the new function $f'_t$ utilizes the feature function to score additional candidates constructed from the neighbors. Therefore, $T_{ix}$ and $T_{jy}$ respectively denote the object text pairs from $S_i$ and $S_j$, $nb(T_{ix})$ denotes the immediate neighbors of $T_{ix}$ in $S_i$, while $nb(T_{jy})$ denotes the immediate neighbors of $T_{jy}$ in $S_j$.

An exponential decay factor can be added for the influence from the neighbors based on temporal distance to each given relation node or object node. For example, an aspect includes considering only immediate neighbors. In another example, the exponential decay factor decreases the influence of each node based on an increase in temporal distance.

Markov Network training engine 208 trains the Markov Network through an optimization process, such as those previously discussed, to generate a trained Markov Network model. One method of optimizing the Markov Network includes using maximum likelihood as the optimization criteria. Parameters associated with the Markov Network and the potential functions can be jointly optimized using this method.

An example optimization method is described. This example assumes that at least a portion of training data 212 is labeled. That is, at least a portion of question-answer pairs 214 include labels indicating whether an answer associated with a question is correct. Binary labels can be used as a yes or no indicator of the correctness or similarity of an answer to a question in training data 212. Again, training data can be associated with a specific domain type, a non-specific domain type, or a combination of both. For the following example, the assumption is made that a portion of or all of training data 212 is labeled, which will be denoted D. With this, the following likelihood function can be maximized:

$$L(w, D) = \sum_{p \in D} w \cdot f(R_i^p, R_j^p) \cdot y_p + w' \cdot f'(T_i^p, T_j^p) \cdot y_p - \log Z^p$$

Here, p denotes a training pair in D, while $y_p$ denotes a label for p.

A gradient can be computed with respect to the Markov Network parameters and the potential function parameters, for example, the softmax function in the case of using BERT. Thus, in this example, the gradient of the objective function is:

$$\nabla L(w, D) = \sum_{p \in D} f(R_i^p, R_j^p) \cdot y_p + f'(T_i^p, T_j^p) \cdot y_p -$$
$$E(f) - E(f') + w \cdot \partial f'(T_i^p, T_j^p) \cdot y_p + w' \cdot \partial f'(T_i^p, T_j^p) \cdot y_p$$

The objective function in this example is concave and allows for various optimization methods. As the described method is intended to be only an example, it should be understood that other suitable optimization methods are available and are intended to be within the scope of this disclosure. One suitable example uses a limited-memory Broyden-Fletcher- Goldfarb-Shanno (L-BFGS) algorithm as the optimizer. The L-BFGS algorithm is beneficial because it has a fast convergence rate. Other optimization methods might include Bayes estimators, least squares, Markov chain Monte Carlo (MCMC), minimum variance unbiased estimator (MVUE), maximum a posteriori (MAP) estimate, and non-linear system identification, among others.

Based on optimizing the Markov Network, Markov Network training engine 208 generates a trained Markov Network model. The trained Markov Network model can be stored in database 204 as trained Markov Network model 216.

Identification engine 210 generally utilizes trained Markov Network model 216 to identify answers to questions. Identification engine 210 uses as input 218 question 220. Question 220 may be received from a computing device, such as a client device. The computing device may include a graphical user interface or another aspect for communicating information. An example includes computing device 600 of FIG. 6.

Upon receiving question 220 as input 218, identification engine 210 uses trained Markov Network model 216 to identify answer 224, which is provided as output 222. Answer 224 can be provided to the computing device for communication via the graphical user interface or any other method for communicating information. For example, input 218 and output 222 can be communicated to or from any component via network 104 of FIG. 2.

Again with reference to FIG. 2, in general, identification engine 210 identifies answer 224 from textual information stored within a dataset. Datasets can be associated with a specific domain type (such as a medical or insurance dataset), a non-specific domain type (such as general information having many different domain types), or a combination of both (such as a portion of the dataset associated with a specific domain type, while the other portion is general information). The dataset domain type can be a specific domain type that is the same as or different from training data 212, a non-specific domain type that is the same as or different that the domain type of training data 212, or a combination that is the same as or different from training data 212.

With specific reference back to FIG. 1, and with reference to all of the figures generally, it should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. It should also be understood that any number of user devices, servers, and other components may be employed within operating environment 100 within the scope of the present disclosure. Each may comprise a single device or multiple devices cooperating in a distributed environment or in the cloud.

Further, many of the elements described herein are functional entities that may be implemented as discrete or distributed components or in conjunction with other components, and in any suitable combination and location. Various functions described herein as being performed by one or more entities may be carried out by hardware, firmware, or software. For instance, some functions may be carried out by a processor executing instructions stored in memory as further described with reference to FIG. 6.

Each of the components shown in FIG. 1, and again within the figures generally, may be implemented via any type of computing device, such as one or more of computing device 600 described in connection to FIG. 6, for example. These components may communicate with each other via a network, such as network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

Example Embodiment Reduced to Practice

Provided is an example embodiment that has been reduced to practice that is in accordance with methods of the present disclosure and performed using the technology described herein. The example is compared to conventional methods to highlight the technology's superior data identification and recall using a trained Markov Network model.

In this example, the present technology is utilized over a diverse set of datasets that are of a specific domain and a non-specific domain. The Microsoft WikiQA dataset is a non-specific domain having a natural set of questions from users. At the time of this disclosure, the Microsoft WikiQA data case can be found at https://www.microsoft.com/en-us/download/details.aspx?id=52419. InsuranceQA is a large-scale question answering dataset from the insurance domain. At the time of this disclosure, the InsuranceQA dataset is available at https://github.com/shuzi/insuranceQA. MedicalQA is a real-world medicalQA dataset generated from patients posting public questions that are answered by doctors on a public web portal. At the time of this disclosure, the data from which MedicalQA is derived is available at https://questiondoctors.com/blog/. Finally, BibleQA contains trivia questions and answers from the Bible domain. The BibleQA dataset, at the time of this disclosure, can be found at https://github.com/helen-jiahe-zhao/BibleQA.

Table 1 is provided to illustrate each of these datasets, including the number of labeled question-answer pairs and the average length of questions and answers.

TABLE 1

|  | Microsoft WikiQA | InsuranceQA | MedicalQA | BibleQA |
|---|---|---|---|---|
| Number of labeled pairs (full) | 20,000 | 12,000 | 4,000 | 6,000 |
| Number of labeled pairs (small) | 1,000 | 600 | 200 | 300 |
| Average Question Length | 37 | 42 | 75 | 60 |
| Average Answer Length | 138 | 290 | 240 | 124 |

The following evaluation conditions are considered: (1) A full in-domain labeled dataset is available; (2) a small number of in-domain labeled data is available (about 5% of the full dataset as provided in Table 1); and (3) no in-domain labeled data is available, but a large labeled background corpus is available.

A background corpus of SQUAD labeled question-answer pairs from a large number of domains is used for the training data. The resulting trained Markov Network model is a Markov Network with BERT for the potential function, which is denoted "MRF+BERT." Since there are two structures of the Markov Network model presented in this disclosure, the MRF+BERT model is performed using both, and the lower accuracy between the two is used for comparison. This helps to make a robust and fair comparison with other methods in view of the two example structures.

The results are compared to two conventional methods: information retrieval (IR) and standard BERT. The IR model utilizes unigram and bigram features to score each pair. It has been historically used for semantic matching when there is in-domain labeled data. By in-domain labeled data, it is meant that the specific domain type of the labeled training data is the same specific domain type of the input question or output answer. Where there is no in-domain labeled data, the training data domain type is different from the input question and output answer. Where there is a limited amount of in-domain data, the training data includes at least a portion of data associated with a specific domain type that is the same as the domain type for the input question or output answer. BERT is a technique that has historically been used with many natural language processing (NLP) applications.

Table 2 presents the accuracy for each domain when there is no in-domain training data available.

TABLE 2

|  | Microsoft WikiQA | InsuranceQA | MedicalQA | BibleQA |
| --- | --- | --- | --- | --- |
| IR | 0.71 | 0.18 | 0.26 | 0.66 |
| BERT | 0.81 | 0.23 | 0.22 | 0.70 |
| MRF + BERT | 0.82 | 0.27 | 0.35 | 0.73 |

Among the comparison methods, IR incurs no training, while BERT and MRF+BERT are trained on the background corpus of the SQUAD data. Here, MRF+BERT consistently achieves greater accuracy for all domains compared to the other techniques. Since MRF+BERT focuses on relations and objects, it is more robust than BERT. For example, while in WikiQA, InsuranceQA, and BibleQA, BERT achieves decent performance relative to the baseline IR; however, its 22% performance in MedicalQA drops significantly with respect to the 35% performance of MRF+BERT. This performance is also worse than the 26% achieved using IR. This shows another flaw using standard BERT, in that it cannot make up for the large domain differences between the MedicalQA domain and the background corpus of SQUAD data. On the other hand, MRF+BERT is less susceptible to the large domain difference, and its performance is consistently better.

Table 3 shows the accuracy for each domain when there is a limited amount of in-domain training data.

TABLE 3

|  | Microsoft WikiQA | InsuranceQA | MedicalQA | BibleQA |
| --- | --- | --- | --- | --- |
| IR | 0.71 | 0.18 | 0.26 | 0.66 |
| BERT | 0.82 | 0.30 | 0.62 | 0.71 |
| MRF + BERT | 0.84 | 0.31 | 0.66 | 0.73 |

The difference in the embodiment represented by the results of Table 3 is that the data of the background corpus for BERT and MRF+BERT now includes a limited amount of in-domain data. Although the accuracies of all methods increase, the relative performance between MRF+BERT and BERT stays fairly consistent across all domains. MRF+BERT again compares favorably with BERT and IR, with absolute gains ranging from 1% to 4% over BERT, and between 7% and 40% over IR. This further demonstrates that utilizing lightweight models based on key semantic units is beneficial when there is no in-domain training data or only a limited amount of in-domain training data. Since MRF+BERT simplifies the problem by dividing each question-answer pair into light-weight semantic units, unlike the previous techniques that build monolithic models on the entire text, MRF+BERT can more easily adapt to diverse resource limitations.

Lastly, Table 4 presents the accuracy with standard supervised learning, where a full in-domain training dataset is available.

TABLE 4

|  | Microsoft WikiQA | InsuranceQA | MedicalQA | BibleQA |
| --- | --- | --- | --- | --- |
| IR | 0.71 | 0.18 | 0.26 | 0.66 |
| BERT | 0.85 | 0.34 | 0.87 | 0.75 |
| MRF + BERT | 0.86 | 0.37 | 0.87 | 0.77 |

As expected, all learning-based methods obtain their best individual results, with MedicalQA recording the largest jump in accuracy compared to the limited data and no training data cases. This is due to MedicalQA being a less common domain, and therefore, in-domain data helps in this case. While MRF+BERT records equal or better accuracies over standard BERT for all domains, the margins appear to be slightly smaller than before. This can be explained by the fact that now there is sufficient in-domain training data to support the training of complex models defined on the entire sentence, thus reducing the relative gap with simpler models. However, from a more holistic point of view drawing results from all settings, MRF+BERT achieves the best robust and empirical performance for model accuracy and generalization across different types of domains and different kinds of resource limitations.

Example Flow Diagrams

Figure 4:
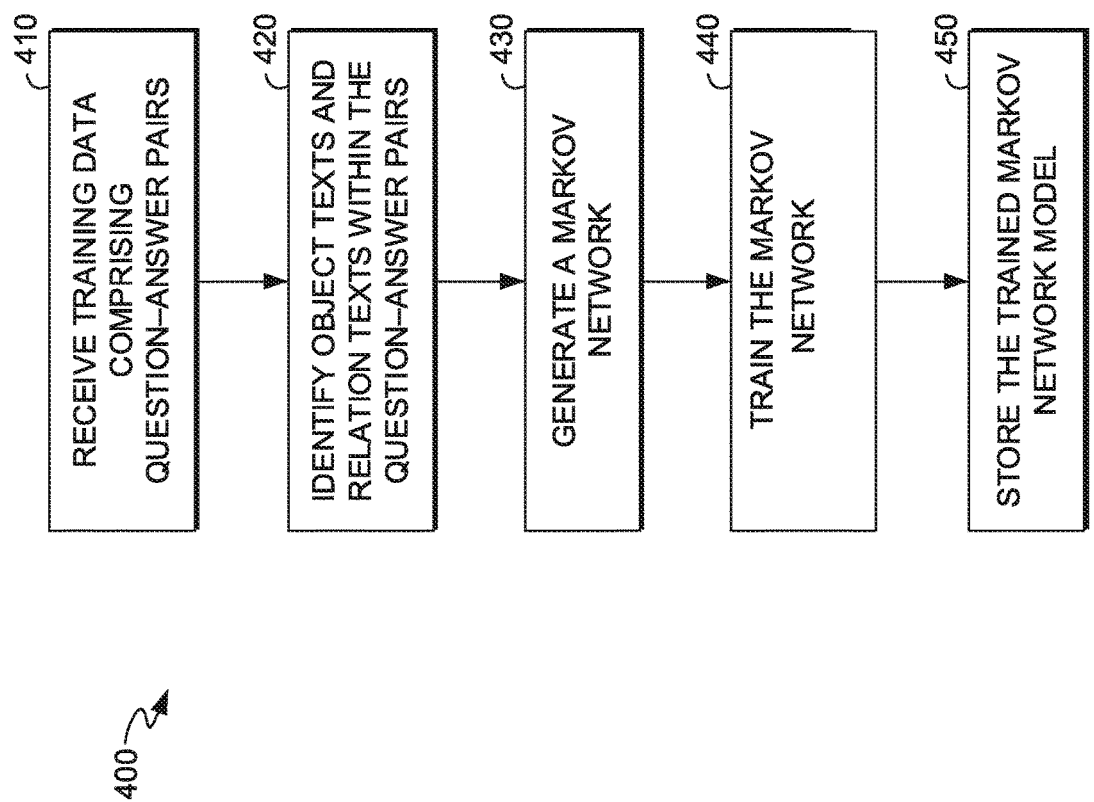
FIG. 4 is a flow diagram illustrating an example method for training a Markov Network for use in natural language semantic matching of questions to answers.
Figure 5:
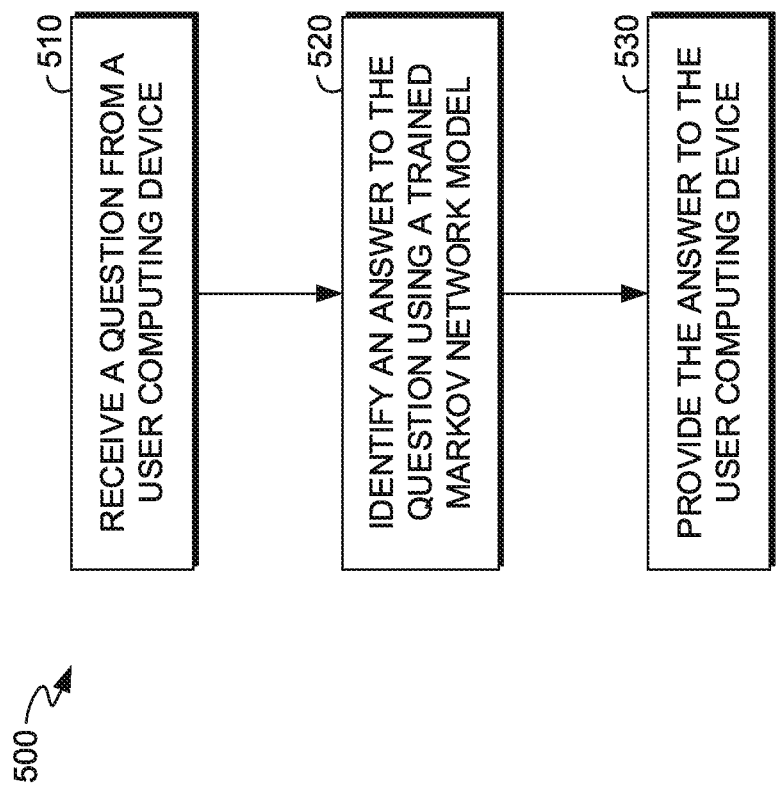
FIG. 5 is a flow diagram illustrating an example method for utilizing a trained Markov Network model to identify answers to questions using natural language semantic matching.

With reference now to FIGS. 4 and 5, flow diagrams are provided illustrating methods 400 and 500 for training a Markov Network model and using the trained Markov Network model to identify answers to questions. Each block of methods 400 and 500 comprise a computing process performed using any combination of hardware, firmware, or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. Methods 400 or 500 may be implemented by natural language semantic matching system 202 as described in conjunction with at least FIGS. 1-3B.

Turning initially to FIG. 4, FIG. 4 illustrates a flow diagram of method 400 for training a Markov Network model to identify answers to questions. At block 410 training data comprising question-answer pairs is received. Training data comprising question-answer pairs may be generated and labeled from crowdsourced answers to questions, or received from a database having pre-labeled question-answer pairs, among other options for receiving training data. At block 420, object texts and relation texts are identified within the question-answer pairs. The object texts and the relation texts can be identified using a parser described in conjunction with parsing engine 206 of FIG. 2. At block 430, a Markov Network is generated based on the identified object texts and the identified relation texts. The Markov Network can be generated using Markov Network training engine 208 of FIG. 2. At block 440, a trained Markov Network model is determined from the Markov Network. The trained Markov Network model may be determined by training the Markov Network using Markov Network training engine 208 of FIG. 2. In aspects, the training may be performed by jointly optimizing parameters of the Markov Network, including the feature function, using a maximum likelihood criterion. At block 450, the trained Markov Network model is stored in a datastore for use in identifying and outputting answers in response to question inputs.

With reference now to FIG. 5, a flow diagram of method 500 is provided for using a trained Markov Network model to identify answers to questions. At block 510, a question is received from a user computing device. The question may be received from the user computing device over a network, such as network 104 of FIG. 1. At block 520, an answer to the question is identified using a trained Markov Network model. The trained Markov Network model can be determined by training a Markov Network that has been generated based on object texts and relation texts identified from question-answer pairs using training data, as previously discussed. At block 530, the answer may be communicated over the network to user computing device.

Example Operating Environment

Having described an overview of embodiments of the present invention, an exemplary operating environment in which embodiments of the present invention may be implemented is described below in order to provide a general context for various aspects of the present invention. Referring now to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc. For example, memory 612 may include computer-executable instructions 624 that can be executed by processor(s) 614.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 600. Computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of computing device 600 to render immersive augmented reality or virtual reality.

Embodiments described herein support training a Markov Network model and using it to identify answers to questions. The components described herein refer to integrated components of natural language semantic matching system. The integrated components refer to the hardware architecture and software framework that support functionality using the product determination system. The hardware architecture refers to physical components and interrelationships thereof and the software framework refers to software providing functionality that can be implemented with hardware embodied on a device.

The end-to-end software-based natural language semantic matching can operate within the natural language semantic matching system components to operate computer hardware to provide identify and provide answers to questions. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. Any other variations and combinations thereof are contemplated with embodiments of the present invention.

Having identified various components in the present disclosure, it should be understood that any number of components and arrangements might be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, or software. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology described with reference to a distributed computing environment; however the distributed computing environment depicted herein is merely an example. Components can be configured for performing novel aspects of embodiments, where the term "configured for" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. One or more computer storage media having computer-useable instructions that, when used by one or more computing devices, cause the one or more computing devices to train a Markov Network model for identifying answers to questions by performing operations comprising:

receiving training data comprising question-answer pairs;

identifying object texts and relation texts within the question-answer pairs;

generating a Markov Network comprising a node network of object nodes and relation nodes, the Markov Network connecting object nodes of questions with object nodes of answers and connecting relation nodes of questions with relation nodes of answers from the question-answer pairs, wherein the object nodes are based on the identified object texts and the relation nodes are based on the identified relation texts;

training the Markov Network by optimizing parameters of feature functions defined on the object nodes and relation nodes, the training resulting in a trained Markov Network model; and storing the trained Markov Network model for use in identifying an answer to a question.

2. The media of claim 1, wherein the question-answer pairs are associated with binary labels, and wherein the binary labels comprise a first label that indicates a correct answer to a question and a second label that indicates an incorrect answer to the question.

3. The media of claim 1, wherein the training data comprises question-answer pairs associated with a non-specific domain type and the trained Markov Network model is for use in identifying an answer from a specific domain type, the non-specific domain type comprising multiple information categories and the specific domain type comprising a specific information category.

4. The media of claim 1, wherein generating the Markov Network further comprises:

forming a relation side structure of the Markov Network that includes the relation nodes, each relation node representing an identified relation text, the relation side structure comprising a plurality of relation binary cliques that each include a relation node pair having a relation first node of a first relation text identified from a question and a relation second node of a second relation text identified from an answer of a question-answer pair, wherein each relation first node for each relation node pair of the plurality of relation binary cliques is dependent upon each relation second node for each relation node pair of the plurality of relation node pairs; and forming an object side structure of the Markov Network that includes the object nodes, each object node representing an identified object text, the object side structure comprising a plurality of object binary cliques that each include an object node pair having an object first node of a first object text identified from the question and an object second node of a second object text identified from the answer of the question-answer pair, wherein each object first node for each object node pair of the plurality of object binary cliques is dependent upon each object second node for each object node pair of the plurality of object node pairs.

5. The media of claim 4, wherein:

a relative position of each of the relation first nodes is determined from a relative position of each of the identified relation texts within the question-answer pair, and wherein each of the relation first nodes is dependent upon adjacent relation first nodes; and a relative position of each of the object first nodes is determined from a relative position of each of the identified object texts within the question-answer pair, and wherein each of the object first nodes is dependent upon adjacent object first nodes.

6. The media of claim 5, wherein an exponential decay factor is applied to the Markov Network based on the relative position of each of the relation first nodes and the relative position of each of the object first nodes.

7. The media of claim 4, wherein each feature function generates a probability score indicating a similarity between each of the plurality of relation binary cliques and each of the plurality of object binary cliques.

8. The media of claim 7, wherein training the Markov Network further comprises jointly optimizing the parameters using a maximum likelihood as optimization criteria.

9. The media of claim 1, wherein each feature function is selected from a deep learning model or an information retrieval model.

10. The media of claim 8, wherein the feature functions are Bidirectional Encoder Representations from Transformers (BERT).

11. A computerized method using a trained Markov Network model for identifying answers to questions, the method comprising:

receiving a question from a user computing device;

identifying an answer to the question using a trained Markov Network model, the trained Markov Network model determined by training a Markov Network comprising a node network of object nodes and relation nodes, the Markov Network connecting object nodes of questions with object nodes of answers and connecting relation nodes of questions with relation nodes of answers from question-answer pairs, the object nodes based on object texts and the relation nodes based on relation texts identified from the question-answer pairs of training data; and providing the answer to the user computing device in response to receiving the question.

12. The method of claim 11, wherein the question received from the computing device is associated with a specific domain type and the training data is associated with a non-specific domain type, the non-specific domain type comprising multiple information categories and the specific domain type comprising a specific information category.

13. The method of claim 11, wherein the training data comprises a first portion associated with a non-specific domain type and a second portion associated with a specific domain type, and the answer is identified from a dataset of the specific domain type, the non-specific domain type comprising multiple information categories and the specific domain type comprising a specific information category.

14. The method of claim 11, wherein the Markov Network comprises:

a relation side structure that includes the relation nodes, each relation node representing an identified relation text, the relation side structure comprising a plurality of relation binary cliques that each include a relation node pair having a relation first node of a first relation text identified from a question and a relation second node of a second relation text identified from an answer of a question-answer pair, wherein each relation first node for each relation node pair of the plurality of relation binary cliques is dependent upon each relation second node for each relation node pair of the plurality of relation node pairs; and an object side structure that includes the object nodes, each object node representing an identified object text, the object side structure comprising a plurality of object binary cliques that each include an object node pair having an object first node of a first object text identified from the question and an object second node of a second object text identified from the answer of the question-answer pair, wherein each object first node for each object node pair of the plurality of object binary cliques is dependent upon each object second node for each object node pair of the plurality of object node pairs.

15. The method of claim 14, wherein:
each of the relation first nodes is dependent upon adjacent relation first nodes; and
each of the object first nodes is dependent upon adjacent object first nodes.

16. The method of claim 14, wherein the Markov Network further comprises an exponential decay factor applied to a relative position of each of the relation first nodes and a relative position of each of the object first nodes.

17. The method of claim 14, wherein the Markov Network is associated with a feature function that generates a probability score indicating a similarity between each of the plurality of relation binary cliques and each of the plurality of object binary cliques.

18. The method of claim 17, wherein the Markov Network is trained by jointly optimizing parameters associated with the feature function using a maximum likelihood as optimization criteria.

19. The method of claim 14, wherein the Markov Network is associated with a feature function, the feature function selected from a deep learning model or an information retrieval model.

20. A computer system comprising:
means for receiving a question from a user computing device;
means for identifying an answer to the question using a trained Markov Network model, the trained Markov Network model determined by training a Markov Network comprising a node network of object nodes and relation nodes, the Markov Network connecting object nodes of questions with object nodes of answers and connecting relation nodes of questions with relation nodes of answers from question-answer pairs, the object nodes based on object texts and the relation nodes based on relation texts identified from the question-answer pairs of training data; and
means for providing the answer to the user computing device in response to receiving the question.

* * * * *